Dec. 10, 1929. W. M. HOWSER Re. 17,516

FILE HOLDER

Original Filed Aug. 16, 1927

Inventor

W. M. Howser

By Watson E. Coleman

Attorney

Reissued Dec. 10, 1929

Re. 17,516

UNITED STATES PATENT OFFICE

WALTER M. HOWSER, OF INDIANAPOLIS, INDIANA

FILE HOLDER

Original No. 1,691,808, dated November 13, 1928, Serial No. 213,324, filed August 16, 1927. Application for reissue filed January 24, 1929. Serial No. 334,816.

This invention relates to file holders and more particularly to a device of this character for use in simultaneously holding a plurality of files for rotative action upon a surface.

An important object of the invention is to provide a device of this character in which the angle of the supported files may be readily altered to suit the surface which is to be acted upon, whereby the tool may be conveniently employed in breaking the glaze on the valve seats of internal combustion engines.

A further object of the invention is to provide a device of this character which may be readily and cheaply constructed, which is simple in its operation and which may be readily adapted or fitted for use in the treatment of valve seats, the guide bores of which vary in size.

These and other objects I attain by the construction shown in the accompanying drawing, wherein for the purpose of illustration is shown a preferred embodiment of my invention and wherein:—

Figure 1:
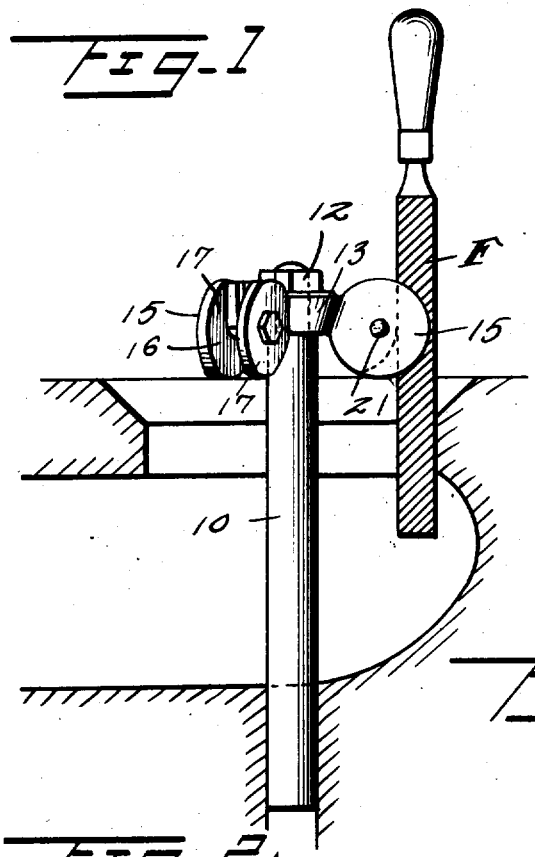
Fig. 1 is a vertical sectional view showing a file holder constructed in accordance with my invention applied to treat a portion of the wall of the valve chamber of an internal combustion engine, one of the files being shown as applied and the remaining files removed from the device.

Referring now more particularly to the drawing, the numeral 10 generally designates a stem having at its upper end a reduction 11, the terminal portion of which is externally screw-threaded for the reception of a tool engageable nut 12. The character 13 generally designates a spider or head herein having an opening for the passage of the stem reduced extension 11, so that the spider may seat upon the shoulder 14 formed by the reduction of the stem 10 and be clamped rigidly thereagainst by the nut 12.

Figure 3:
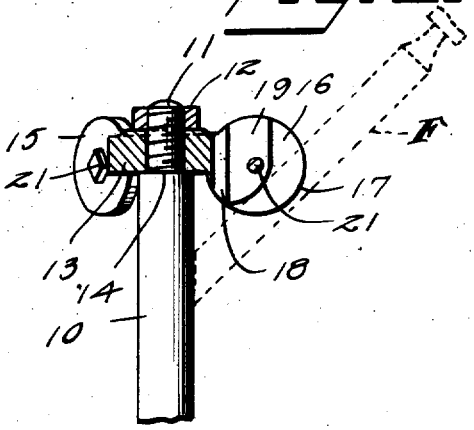
Fig. 3 is a vertical sectional view therethrough.
Figure 2:
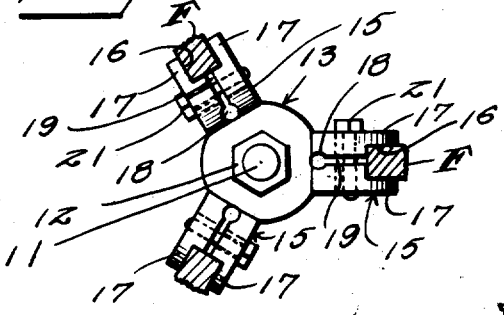
Fig. 2 is a plan view of the file holder.
Figure 5:
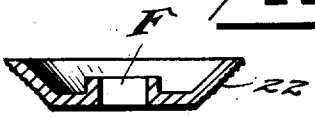
Fig. 5 is a sectional view therethrough.
Figure 4:
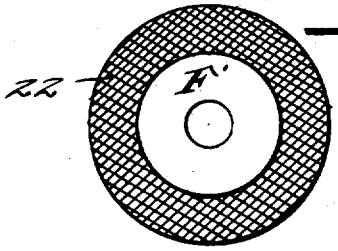
Fig. 4 is a plan view of an alternative form of file which may be employed when treating valve seats.

The spider 13 comprises a hub portion from which radiate uniformly spaced arms 15. The outer end and under face of each arm is provided with a file receiving channel 16 producing spaced flanges 17. The inner ends of the arms are pierced by vertically extending bores 18 and from the base of the channels 16 to the bores 18, the arms are split, as at 19. Inwardly of the channels, each arm is provided with a bore 20 for the reception of a binding screw 21, the bore 20 at one side of the split 19 permitting rotation of the bolt and at the opposite side of the split being threaded for coaction therewith, so that this bolt may be employed to constrict the opening at the split and thus cause the adjacent flanges 17 to approach one another and clamp the file F intermediate its ends to expose a full longitudinal element thereof. Herein a flat file of square outline in cross-section is illustrated and as will be apparent after one face of the file has become dulled, another face of the same file may be presented. As shown in Fig. 2 each clamping construction mounts a file and exposes a longitudinal element thereof. The several clamping constructions are adjusted upon the head for vertical positioning of the file (see Fig. 1) or may be positioned to hold the files in inclined relation to the stem as shown in Fig. 3.

It will be obvious that in breaking the glaze of or removing carbon from the valve seats or the adjacent portions of the gas conducting channels of internal combustion engines, the stem 10 may be extended into the guides, files F placed in the channels 16 of the arms, fitted against the surface which is to be operated upon and secured by adjusting the clamping screws 21. The nut 12 is preferably of such size that it may be conveniently engaged by the type of wrench ordinarily known in the automobile industry as a speed wrench, thereby enabling the device to be rapidly and conveniently rotated.

Figure 6:
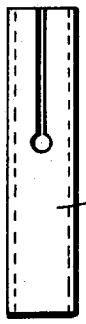
Figs. 6 and 7 are views of bushings which may be employed for guiding the stem in enlarged bores.
Figure 7:
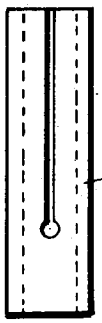

For use in dressing valve seats, file structures generally shown at F′ may be employed. This comprises a disk adapted to replace the spider 13 upon the stem 10 having a conical periphery 22 formed as a file for coaction with the valve seat. To enable the stem 10 to be fitted in bores of different diameters, bushings such as illustrated in Figures 6 and 7 at 23 may be employed. Where the bores are closely related as to diameter, stems of different sizes may be employed.

It will be obvious that a device of this character may be very readily and cheaply produced and may be readily prepared for use upon any given surface by anyone who is in any way familiar with the handling of tools. It will also be obvious that the construction hereinbefore set forth is capable of a certain range of change and modification without materially departing from the spirit of the invention and I accordingly do not limit myself to such specific structure except as hereinafter claimed.

I claim:—

1. In a rotatable file holder for holding files, a coaxial stem having at one end a plurality of radiating arms, the outer end of each arm having an outwardly opening file receiving groove, said grooves being substantially equi-distant from the stem axis to present a series of filing elements exteriorly of the device for simultaneous and rotative operation upon a circumscribing surface, said arms being split, and means for contracting the split ends of the arms to clamp the files engaged therewith.

2. In a rotatable file holder for holding files, a coaxial stem having at one end a plurality of radiating arms the outer end of each arm having an outwardly opening file receiving groove, said grooves being substantially equi-distant from the stem axis to present a series of filing elements exteriorly of the device for simultaneous and rotative operation upon a circumscribing surface, said arms being split to permit their contraction upon a file supported in the groove, and means for contracting the arm, said grooves extending across the outer ends and under faces of the arms to thereby permit the file to be disposed in a desired angular relation to the axis of the stem.

3. In a device for holding files for use in treating relatively small circumscribing cylindric or conic faces such as valve seats and ports and wherein the face to be treated has associated therewith a bore which is coaxial, a stem adapted to engage in the bore, a spider secured to the stem at one end thereof and embodying radiating arms, and means opening outwardly at the outer ends of said arms for clamping supporting files in a desired angular relation to the axis of stem and exposing a series of separated filing elements exteriorly of the device permitting circumscribing surface operation.

4. In a device for holding files for use in treating relatively small circumscribing cylindric or conic faces such as valve seats and ports and wherein the face to be treated has associated therewith a bore which is coaxial, a stem adapted to engage in the bore, a spider secured to the stem at one end thereof and embodying radiating arms, the outer end of each arm having a file receiving groove, said arms being split and opening outwardly to present a series of filing elements exteriorly of the device for rotative operation upon a circumscribing surface, and means for contracting the split ends of the arms to contract said ends and clamp files disposed within the grooves.

5. A rotatable unitary device of the character described including a supporting head, a central and coaxial tool engageable portion upon the top of said head, an elongated coaxial stem projecting from the bottom of said head, and a plurality of file clamps supported by the head and each opening outwardly and arranged to rigidly and laterally grip a file having an uninterrupted peripherally enveloping filing surface by partially embracing the same for exposing an entire longitudinal filing surface element thereof whereby a series of separated filing surface elements is exposed exteriorly of the device for rotative operation upon a circumscribing surface.

6. A rotatable unitary device of the character described including in combination a supporting head, a central and coaxial tool engageable portion upon the top of said head, an elongated coaxial stem projecting from the bottom of said head, and a plurality of file clamps supported by the head and each opening outwardly and arranged to rigidly and laterally grip a file having an uninterrupted peripherally enveloping filing surface by partially embracing the same for exposing an entire longitudinal filing surface element thereof whereby a series of separated filing elements is exposed exteriorly of the device for rotative circumscribing surface operation, said file clamps being arranged in spaced relation about said head and equi-distant from the axis of said stem.

7. A rotatable unitary device of the character described including in combination a supporting head, a central and coaxial tool engageable portion upon the top of said head, an elongated coaxial stem projecting from the bottom of said head, and a plurality of file clamps supported by said head and each opening outwardly and arranged to rigidly and laterally grip by partial embracement a file having an uninterrupted peripherally enveloping filing surface and exposed substantially an entire longitudinal filing surface element thereof whereby a series of separated filing elements is exposed exteriorly of the device for rotative circumscribing surface operation, said file clamps being arranged to position said file in inclined relation to the stem axis, the projections from a plurality of the files having a common intersection with the stem axis.

8. A rotatable unitary device of the character described including in combination a supporting head, a central and coaxial tool engageable portion upon the top of said head, an elongated coaxial stem projecting from the bottom of said head, and a plurality of file clamps pivotally supported by said head upon axes having a common plane transverse to the stem axis, each clamp opening outwardly and partially embracing a file having an uninterrupted peripherally enveloping filing surface for laterally and rigidly clamping the same and exposing substantially an entire longitudinal filing surface element thereof, whereby a series of separated filing elements is exposed exteriorly of the device for rotative circumscribing surface operation.

9. A rotatable unitary device of the character described including in combination a supporting head, a central and coaxial tool engageable portion upon the top of said head, an elongated coaxial stem projecting from the bottom of said head, and a plurality of file clamps supported by the head and each opening outwardly and arranged to rigidly grip intermediate the ends a file having an uninterrupted peripherally enveloping filing surface and expose substantially an entire longitudinal filing surface element thereof whereby a series of separated filing elements is exposed exteriorly of the device for rotative circumscribing surface operation.

10. A rotatable device of the character described including in combination a supporting head, a central and coaxial tool engageable portion upon the top of said head, an elongated coaxial stem projecting from the bottom of said head, and a plurality of file clamps supported by the head and each opening outwardly and arranged to rigidly grip intermediate the ends a file having an uninterrupted peripherally enveloping filing surface and expose substantially an entire longitudinal filing surface element thereof whereby a series of separated filing elements is exposed exteriorly of the device for rotative circumscribing surface operation, said file clamps being arranged in spaced relation about said head and equi-distant from the axis of said stem.

11. A rotatable unitary device of the character described including in combination a supporting head, a central and coaxial tool engageable portion upon the top of said head, an elongated coaxial stem projecting from the bottom of said head, and a plurality of file clamps supported by said head and each opening outwardly and arranged to rigidly grip intermediate the ends a file having an uninterrupted peripherally enveloping filing surface and expose substantially an entire longitudinal filing surface element thereof whereby a series of separated filing elements is exposed exteriorly of the device for rotative circumscribing surface operation, said clamps being arranged to position the files in inclined relation to the stem axis, the projections from a plurality of the separated filing surface elements having a common intersection with the stem axis.

12. A rotatable unitary device of the character described including in combination a supporting head, a central and coaxial tool engageable portion upon the top of said head, and a plurality of file clamps pivotally supported by said head upon axes having a common plane transverse to the stem axis each clamp opening outwardly and being arranged to rigidly grip intermediate the ends a file having an uninterrupted peripherally enveloping filing surface and expose substantially an entire longitudinal filing surface element thereof whereby a series of separated filing elements is exposed exteriorly of the device for rotative circumscribing surface operation.

In witness whereof, I have hereunto affixed my signature.

WALTER M. HOWSER.